United States Patent
Lyle

(10) Patent No.: US 7,441,065 B2
(45) Date of Patent: Oct. 21, 2008

(54) METHOD AND APPARATUS FOR A TWO-WIRE SERIAL COMMAND BUS INTERFACE

(75) Inventor: Jim Lyle, Santa Clara, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 11/713,241

(22) Filed: Mar. 1, 2007

(65) Prior Publication Data
US 2007/0150629 A1   Jun. 28, 2007

Related U.S. Application Data

(62) Division of application No. 10/171,820, filed on Jun. 13, 2002, now Pat. No. 7,225,282.

(51) Int. Cl.
*G06F 13/36* (2006.01)
(52) U.S. Cl. .......................... 710/310; 710/52
(58) Field of Classification Search ............... 710/310, 710/52
See application file for complete search history.

(56) References Cited

U.S. PATENT DOCUMENTS

| 4,711,976 | A | * | 12/1987 | Narjes ........................ 178/2 C |
|---|---|---|---|---|
| 4,818,994 | A | | 4/1989 | Orth et al. |
| 5,650,777 | A | * | 7/1997 | Westfield et al. ........ 340/870.11 |
| 5,689,196 | A | * | 11/1997 | Schutte ........................ 326/86 |
| 6,330,525 | B1 | * | 12/2001 | Hays et al. ................... 702/183 |
| 6,397,277 | B1 | | 5/2002 | Kato et al. |
| 6,996,112 | B2 | | 2/2006 | Fukunaga et al. |
| 7,060,006 | B1 | | 6/2006 | Watterson et al. |
| 2002/0108011 | A1 | | 8/2002 | Tanha |
| 2004/0049616 | A1 | | 3/2004 | Dunstan et al. |
| 2005/0031127 | A1 | | 2/2005 | Gosior et al. |
| 2005/0246475 | A1 | | 11/2005 | Ervin |

OTHER PUBLICATIONS

Philips Semiconductors, Philips Corporation of Holland, Philips Part # PCA9515 I²C-bus repeater (Mar. 1, 2002).
Philips Semiconductors, Philips Corporation of Holland, Philips Part # PCA9515 I²C-bus repeater (May 13, 2002).

* cited by examiner

*Primary Examiner*—Clifford H Knoll
(74) *Attorney, Agent, or Firm*—Perkins Coie, LLP

(57) ABSTRACT

A method for bi-directional transmission of data between a source and a sink over a two-wire interface includes re-mapping a data signal and a clock signal from a first local bus on the source into a different protocol signal. Transmitting the different protocol signal from the source to the sink over the two-wire interface. Re-mapping the different protocol signal back into the data signal and the clock signal for use on a second local bus on the sink. Re-mapping the data signal and the clock signal from the second local bus into the different protocol signal; and transmitting the different protocol signal from the sink to the source over the two-wire interface.

16 Claims, 10 Drawing Sheets

"NEGOTIATE AND SET"

"SET AND TEST"

US 7,441,065 B2

METHOD AND APPARATUS FOR A TWO-WIRE SERIAL COMMAND BUS INTERFACE

CROSS REFERENCE TO RELATED APPLICATIONS

This application is a divisional of U.S. application Ser. No. 10/171,820, filed Jun. 13, 2002 now U.S. Pat. No. 7,225,282, which application is hereby incorporated by reference.

FIELD OF THE INVENTION

The present invention relates generally to digital communication between a transmitter and a receiver, and more particularly to communication between a video source device and a video display device.

BACKGROUND OF THE INVENTION

FIG. 1 illustrates a prior art system 10 of how a transmitter 20 and a receiver 30 communicate. The transmitter 20 can be, for example, a computer, a DVD player or other video source and the receiver 30 can be a monitor or a television. Communication between the transmitter 20 and the receiver 30 is typically achieved via the DVI (digital visual interface) 40 which is a single interface that contains various lines bundled into one cable. An HDMI link (high definition multi-media interface) or some other variant can also achieve communication between the transmitter 20 and the receiver 30. Some of these lines include a hot plug signal, a power line, TMDS® (transition minimized differential signaling) 50 (typically used for carrying video data) and a DDC (display data channel) bus 60.

The DDC bus 60 is a serial 2-wire interface that has one data line and one clock line. This serial protocol is believed to have been developed, at least in part by the Philips Corporation of Holland. Philips part #PCA9515 is an integrated circuit which implements the so-called I²C bus. One of the primary purposes of the DDC bus 60, when used as an I²C bus, is to read an EDID PROM 70 (extended data interface device programmable read only memory) which includes data concerning the receiver 30. The DDC bus 60 can also be used for data transfer with HDCP 80 (high-bandwidth digital content protection), which is an encryption device that provides content protection.

Several problems are associated with the DDC bus 60 that make it undesirable for certain applications. One problem is that it can not be of an extended physical length due to electrical issues such as overwhelmed capacitive load budgets and transmission line effects that degrade signal timing parameters. Another problem is that its data carrying capacity is limited to about 400 kilobits/second. The data on the DDC bus 60 can be easily eavesdropped and even manipulated and since it may connect to several devices in the transmitter 20, security is also an issue. Finally, any attempt to solve these problems would need to take into consideration legacy issues for the purpose of backward compatibility. That is, the DDC bus is very widely used and any attempt to improve upon it would need to be compatible with transmitters and receivers that use the standard DDC bus interface.

Accordingly, what is needed is a method and apparatus for a DDC compatible two-wire serial command interface which allows for high speed data transmission, extended cable length, data security and still provide backward compatibility.

SUMMARY OF THE INVENTION

The present invention provides a system and method for intelligently remapping a two-wire interface between a transmitter and a receiver. The remapping allows for high speed data transmission and data security and is not constrained by length issues. Additionally, a transmitter-side firewall prevents unauthorized access.

A method for bi-directional transmission of data between a source and a sink over a two-wire interface, in accordance with the present invention, includes remapping a data signal and a clock signal from a first local bus on the source into a different protocol signal. Transmitting the different protocol signal from the source to the sink over the two-wire interface. Re-mapping the different protocol signal back into the data signal and the clock signal for use on a second local bus on the sink. Re-mapping the data signal and the clock signal from the second local bus into the different protocol signal; and transmitting the different protocol signal from the sink to the source over the two-wire interface.

A system for bi-directional transmission of data between a source and sink over a two-wire interface, in accordance with the present invention, includes a first translator that is responsive to and operative to develop a first local bus signal and is responsive to and operative to develop a different protocol signal. A first buffer is responsive to and operative to develop the first local bus signal and is responsive to and operative to develop a buffered data signal and a buffered clock signal. Logic is responsive to the first local bus signal and operative to controlling a first switch coupled to the two-wire interface wherein the switch connects to the first translator, the first buffer or a firewall setting. A second translator is responsive to and operative to develop the different protocol signal and is responsive to and operative to develop a second local bus signal when the first switch is connected to the first translator and a second switch coupled to the two-wire interface is connected to the second translator. A second buffer is responsive to and operative to develop the buffered data signal and the buffered clock signal and is responsive to and operative to develop the second local bus signal when the first switch is connected to the first buffer and the second switch coupled to the two-wire interface is connected to the second buffer.

A method for buffering signals between a source and a sink over a two-wire interface, in accordance with yet another aspect of the present invention, includes buffering on the source a data signal and a clock signal received from a local bus on the source. Transmitting, from the source to the sink, the data and clock signals over the two-wire interface. Buffering at the sink the data and clock signals. Re-transmitting from the sink the data and clock signals over the two-wire interface to the source as needed; and logic on the source that performs a firewall function by selectively closing access to the two-wire interface.

A system for buffering signals between a source and a sink over a two-wire interface, in accordance with the present invention, includes a first buffer responsive to a first local bus signal and responsive to and operative to develop a buffered data signal and a buffered clock signal. A logic is responsive to the first local bus signal and operative to controlling a first switch coupled to the two-wire interface wherein the switch connects to the first buffer or a firewall setting. A second buffer is responsive to and operative to develop the buffered data signal and the buffered clock signal and is responsive to and operative to develop a second local bus signal when the first switch is connected to the first buffer and a second switch coupled to the two-wire interface is connected to the second buffer.

A system for buffering signals between a source and a sink over a two-wire interface, in accordance with the present invention, includes a first buffer that is responsive to a first local bus signal and operative to develop a buffered data signal and a buffered clock signal. A logic is responsive to the first local bus and operative to controlling a first switch coupled to the two-wire interface wherein the switch connects to the first buffer or a firewall setting. The sink is coupled to the two-wire interface and is responsive to the buffered data signal and the buffered clock signal when the switch is connected to the first buffer.

An advantage of the present invention is that it is fully compatible with legacy hardware. It intelligently detects whether a device can support new or old protocols and adjusts accordingly. Additionally, even in the absence of new protocol compatibility, it improves upon legacy systems by increasing available cable length and also by providing a transmitter-side firewall. Also, security is improved and new protocols can be designed to be more readily sent through a receiver to another device or another level, for example, though a repeater coupled to two receivers.

These and other advantages of the present invention will become apparent to those skilled in the art after reading the following descriptions and studying the various figures of the drawings.

DETAILED DESCRIPTION OF THE INVENTION

Figure 1:
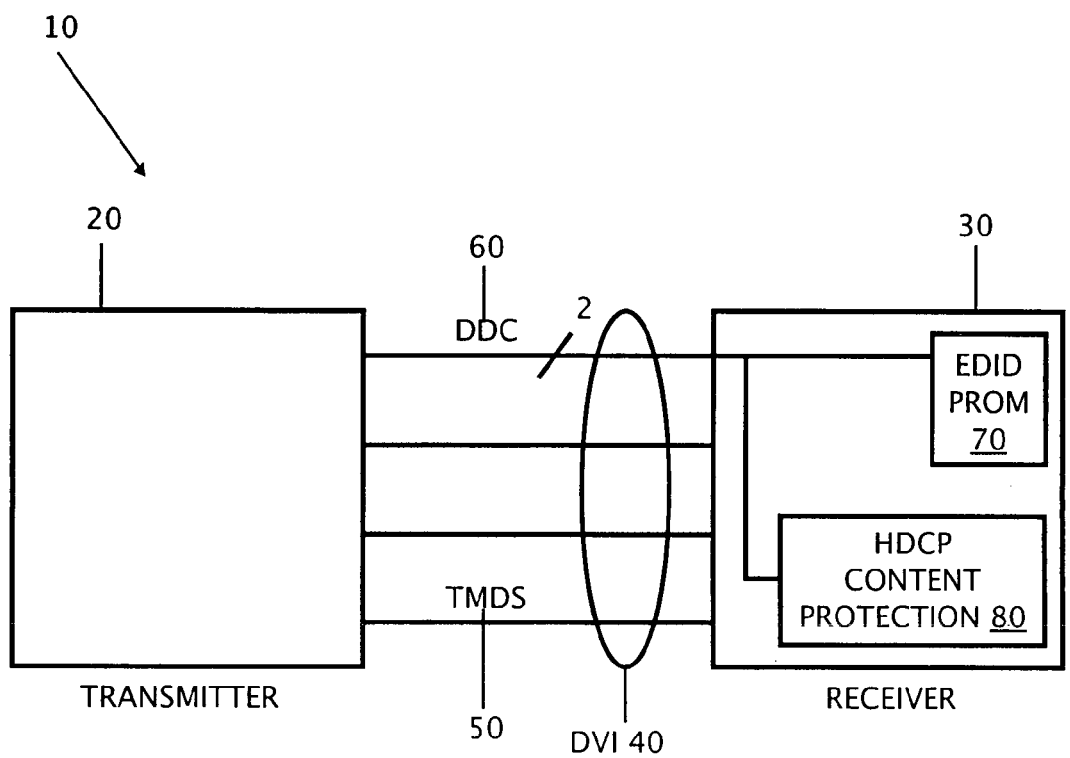
FIG. 1 illustrates a prior art system of how a transmitter and a receiver communicate.
Figure 2A:
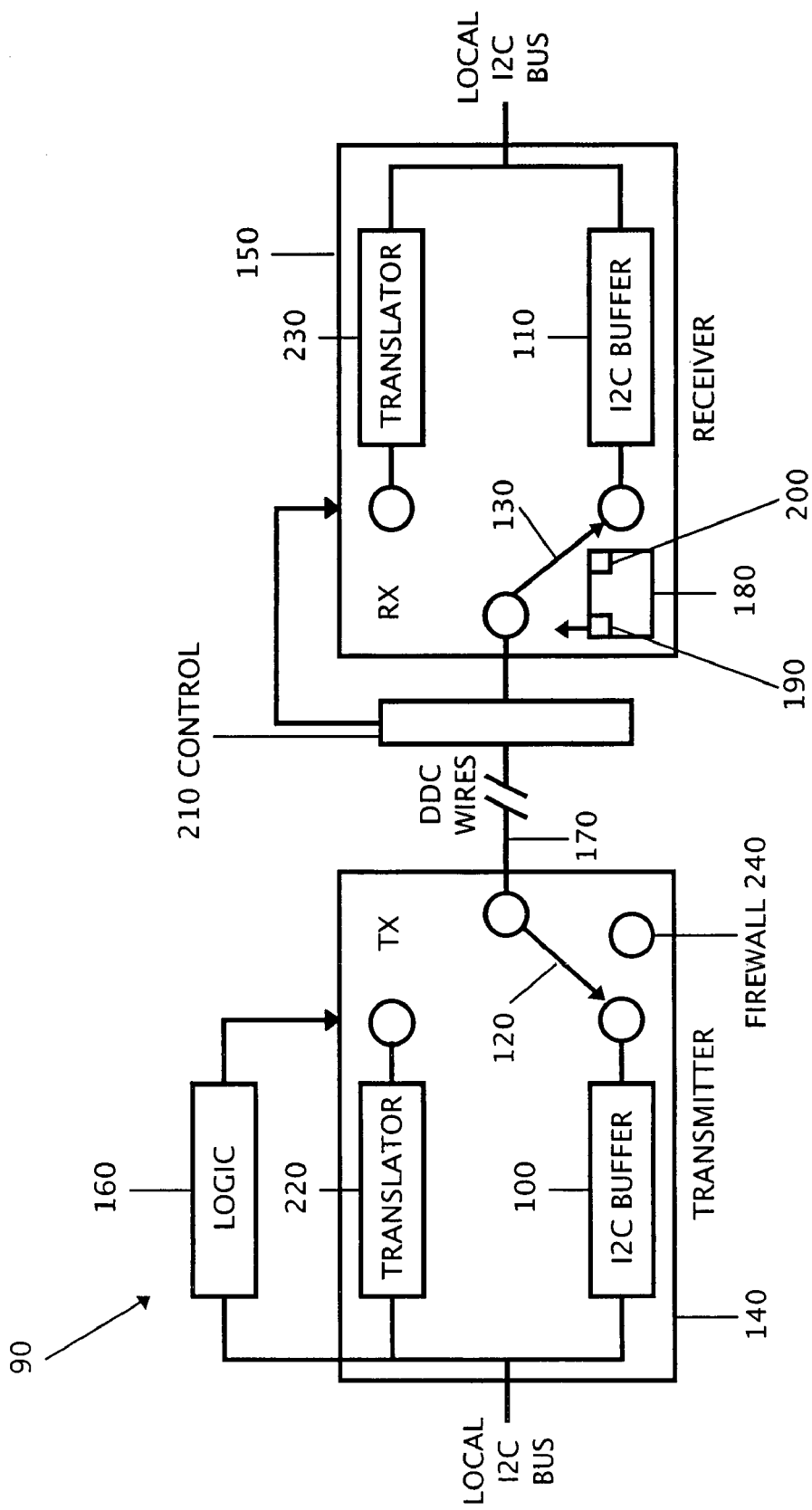
FIG. 2A illustrates a transmitter and receiver communication system via buffers in accordance with the present invention.

FIG. 1 was described with reference to the prior art. FIG. 2A illustrates a transmitter and receiver communication system 90 via buffers 100 and 110 in accordance with the present invention. In the context of the present invention, it should be understood that the terms "transmitter", "host" and "source" can be used interchangeably and refers to devices capable of sending out signals that can control some other device as well as receive signals from that device. Also, it should be understood that "slave", "receiver" and "sink" can also be used interchangeably and refers to a device that is controlled by a transmitter via signals and can send out signals to the transmitter.

FIG. 2A depicts a default mode in that, at system startup, switches 120 and 130 are connected to I²C buffers 100 and 110, located on transmitter 140 and receiver 150 respectively. Other default modes are also available. Logic 160 sends a signal over DDC wires 170 and reads register 180. Contained within register 180, there is a control bit 190 and a status bit 200 that contain information on what the receiver 150 is capable of. Depending on that information, logic 160 will direct control 210 to keep switches 120 and 130 in their default positions or switch to translators 220 and 230. This is one example of how the proper mode to use is determined. This example and others will be fully explained subsequently.

If switches 120 and 130 are left in their default modes, improvements are still evident over prior art systems due to the presence of the buffers 100 and 110 and firewall setting 240. By buffering, the length of the DDC wires can be extended. On the transmitter 140, switch 120 can be placed at firewall setting 240 by logic 160. When firewall setting 240 is selected, access to the transmitter 140 via DDC wires 170 is cut off. Advantageously, this provides greater security on the transmitter 140 since access via the DDC wires 170 can be controlled and is no longer in a perpetually connected state. Additionally, in the context of the present invention, it should be understood that the terms "protocol" and "mode" can be used interchangeably and refer to a specified format of data communication or data transfer.

Figure 2B:
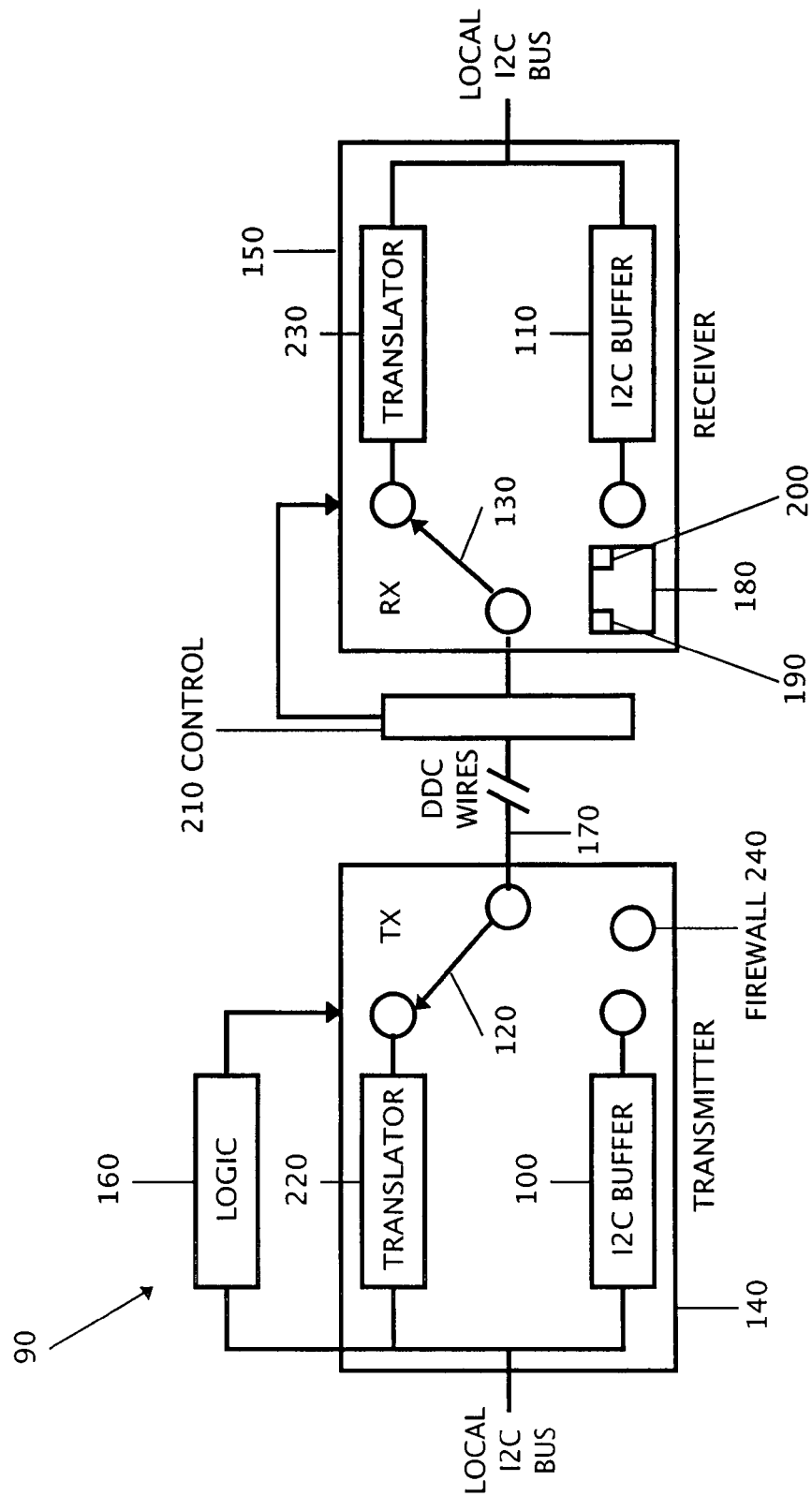
FIG. 2B illustrates a transmitter and receiver communication system via translators in accordance with the present invention.

FIG. 2B illustrates a transmitter and receiver communication system 90 via translators 220 and 230 in accordance with the present invention. Switches 120 and 130, located on transmitter 140 and receiver 150 respectively, are connected to translators 220 and 230. In this particular example, logic 160 directed control 210 to connect switches 120 and 130 to translators 220 and 230 due to information contained in register 180. Specifically, control bit 190 and status bit 200 indicated that the receiver is capable of using the new protocol. This is one example of how the proper mode to use is determined, and this and other examples will be fully explained subsequently. When the new protocol can be employed, more efficient signaling can be used to improve transmission speed, extend wire length and improve security by encryption. Some example signaling techniques include the well-known TCP/IP, differential signaling, ethernet and current loop. Any of these signaling techniques can additionally be encrypted. Translator 220 converts the I²C signal into the new protocol and transmits it over DDC wires 170. Translator 230 then converts the new protocol back into an I²C signal for use on the receiver 150. Since the pre-existing DDC wires 170 are used to transmit the old as well as new protocols, compatibility with legacy hardware is achieved. Additionally, a firewall setting 240 is available on transmitter 140 and operates in the same manner as firewall setting 240 of FIG. 2A.

It should be understood that the receiver 150 could also send information to the transmitter 140. It will also be appreciated that, in some circumstances, the receiver 150 can initiate communications with the transmitter.

In an additional embodiment, both default and new modes (as shown in FIGS. 2A and 2B) can be used simultaneously in a manner that is similar in concept to DSL (digital subscriber line). In DSL, a high speed Internet connection is transmitted on the same wire or sets of wires as an old-style telephone signal by separating the two signals in the frequency spectrum. The same technique can be used for the present invention. The switch 120, in this case, would act as a mixer and blend the two signals for transmission on the DDC wires 170. Switch 130 would then act as a separator and on the receiving side. Besides a frequency spectrum separation of the signals, a voltage separating technique could also be used.

Figure 3A:
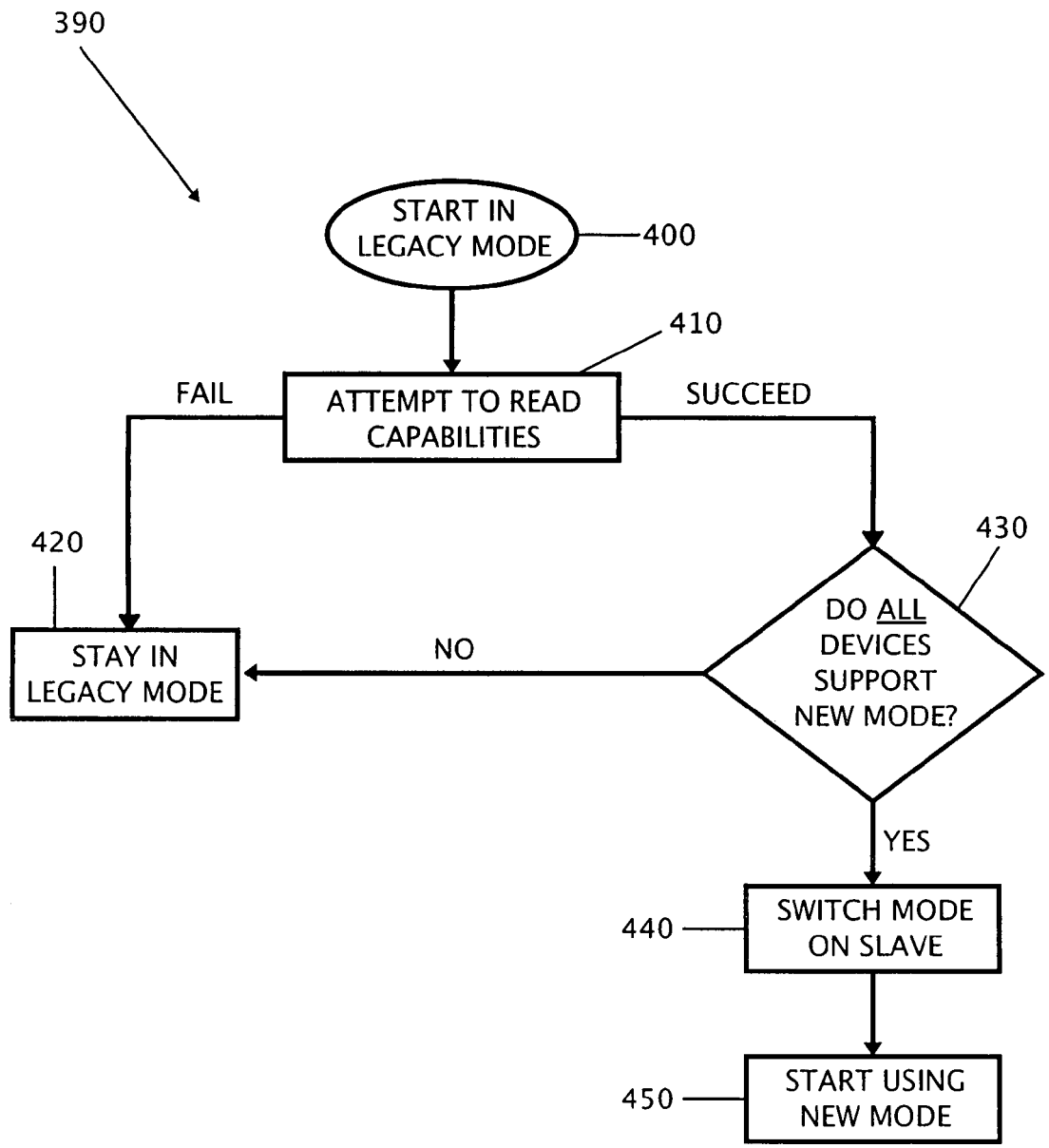
FIG. 3A illustrates a flow diagram for a "negotiate and set" process in accordance with the present invention.

FIG. 3A illustrates a flow diagram for a "negotiate and set" process 390 in accordance with the present invention. The negotiate and set process 390 is one example of how logic 160 functions. In an operation 400, the legacy mode or old style of communication over a set of DDC wires is used. At operation 410, the capabilities of the receiver (for example receiver 150) are determined. This is accomplished by reading bit register 180 or by reading an EDID PROM 70. It can also be accomplished if the operation fails which is an indication that the receiver does not have the new mode capabilities defined. If it is determined that the receiver 150 can only understand the legacy mode protocol, then the legacy mode will be used at operation 420. If it is determined that some devices located on the transmitter can use the new mode, the rest of the devices are polled at operation 430 determine if they all can do so. If not, control is passed to operation 420 and the legacy mode is used. Conversely, if all the devices can support the new mode, then the mode of operation at the receiver will be switched at operation 440 and the new mode will then be used via operation 450.

Figure 3B:
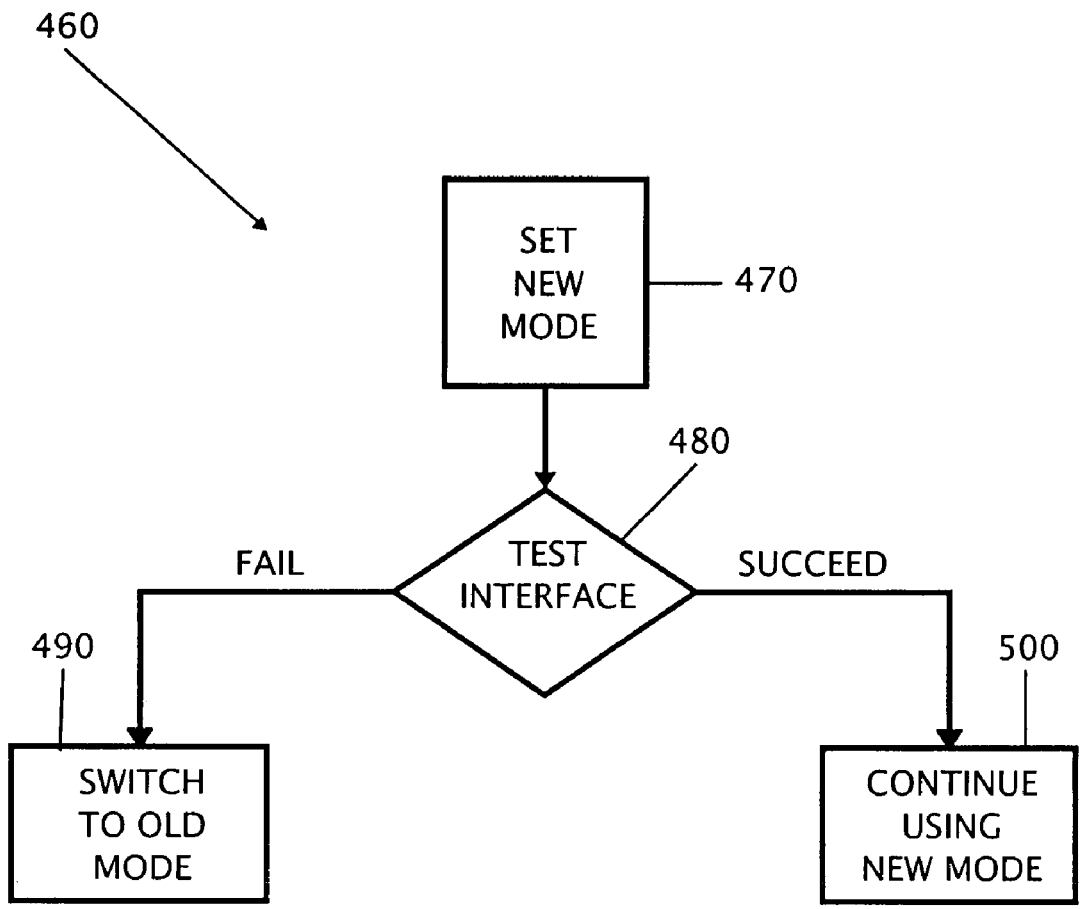
FIG. 3B illustrates a flow diagram for a "set and test" process in accordance with the present invention.

FIG. 3B illustrates a flow diagram for a "set and test" process 460 in accordance with the present invention. The set and test process 460 is another example of how logic 160 functions. At an operation 470, the new mode of communication is set. At operation 480, the receiver/interface is tested to see if the new mode is understandable. If the test fails, the old mode of communication is used via operation 490. If the test succeeds, the new mode will be used for communications via operation 500.

Figure 3C:
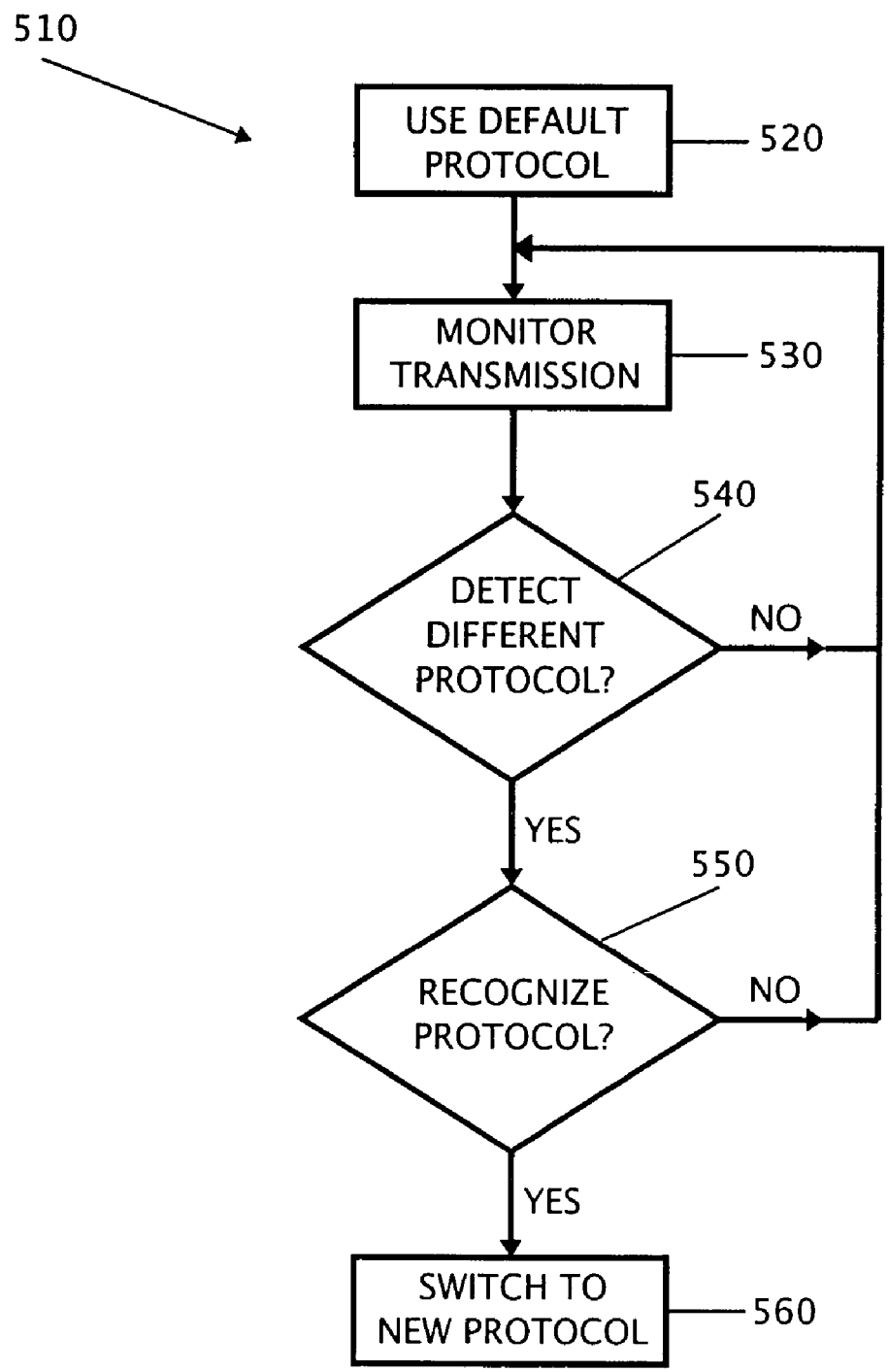
FIG. 3C illustrates a flow diagram for a "snoop and test" process in accordance with the present invention.

FIG. 3C illustrates a flow diagram for a "snoop and test" process 510 in accordance with the present invention. The snoop and test process 510 is yet another example of how logic 160 can function. At operation 520, the default protocol is used. At an operation 530, the bus is monitored for a response in any format other than the default protocols. Once a transmission is received, it is determined if it differs from the default protocols, at operation 540. If a different protocol is not detected at operation 540, then the transmission will continue to be monitored via operation 530. If a different protocol is detected, then it is decided if the different protocol is recognizable at operation 550. If it isn't, then the transmission will continue to be monitored via operation 530. If it is recognized, then the new protocol will be used via operation 560.

Figure 4:
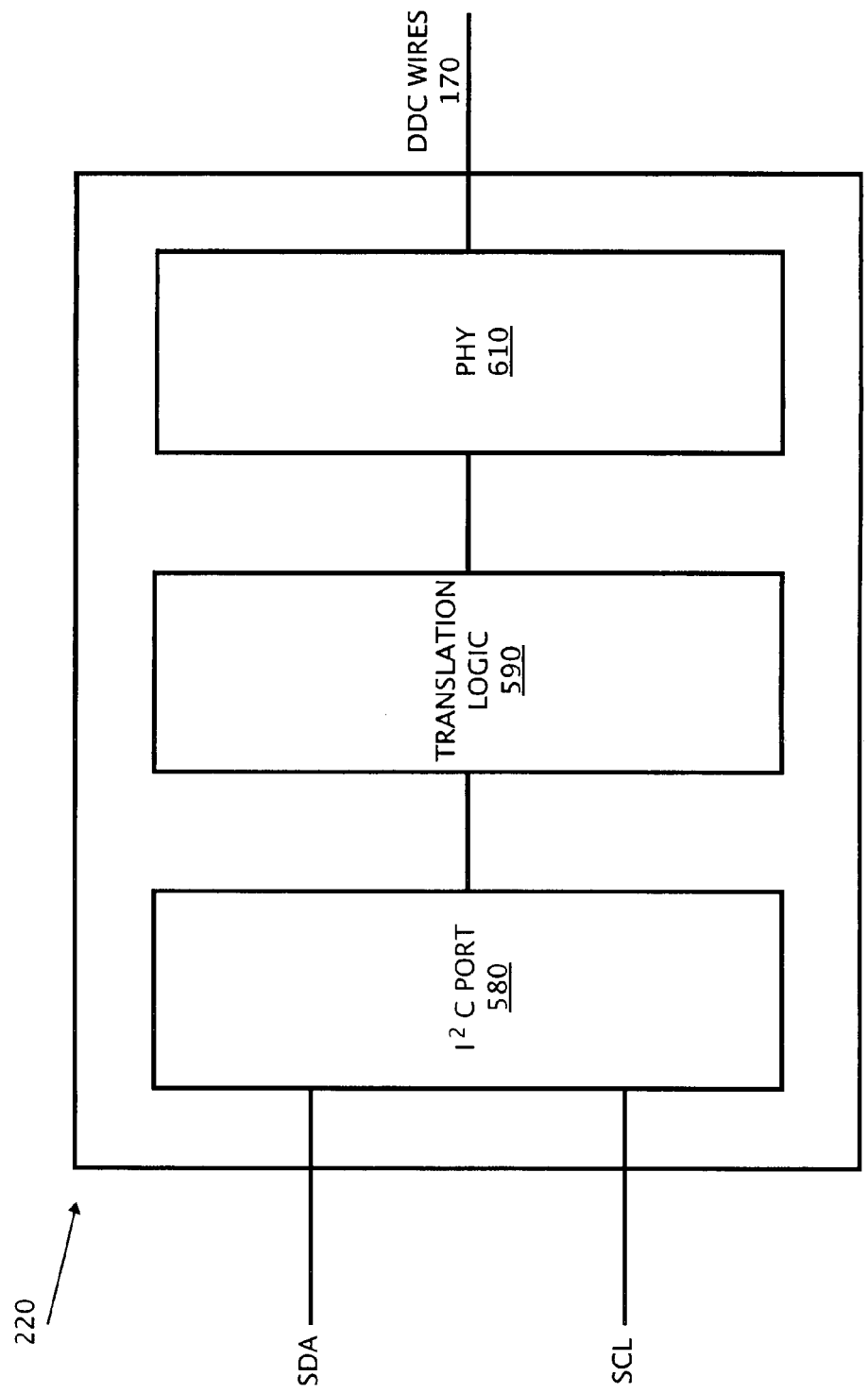
FIG. 4 illustrates a translator in accordance with the present invention.

FIG. 4 illustrates a translator 220 in accordance with the present invention. Translator 220 is also a mirror image of translator 230. SDA (serial data line) and SCL (serial clock line) are the two components of the I²C bus that are connected to the I²C port 580 where SDA and SCL are converted into internal blocks of data. The data is then translated at the translation logic block 590 and connected to the DDC wires 600 via the PHY (physical interface) 610. Some examples of translation logic are ethernet, TCP/IP, current loop, differential signaling and cryptographic encryption/decryption logic.

Figure 5:
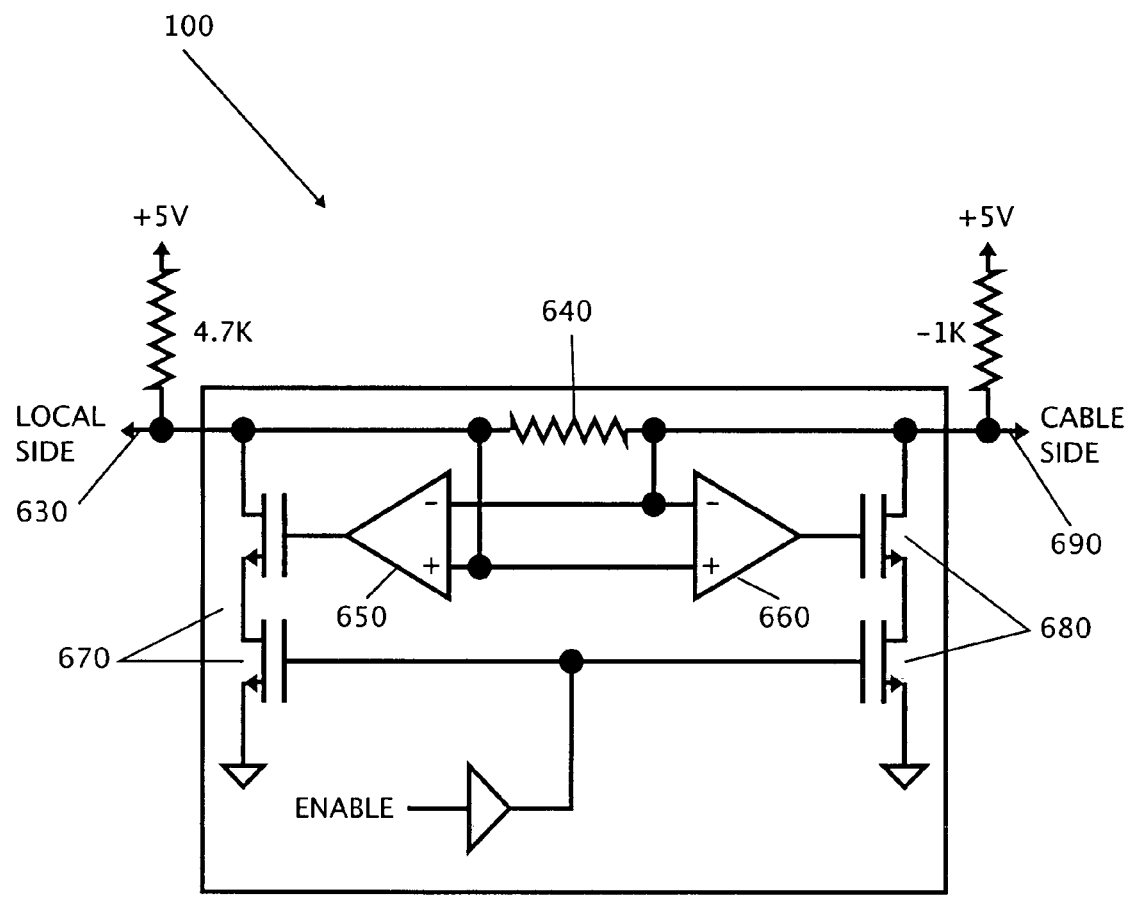
FIG. 5 illustrates a general implementation of a buffer for an I²C bus in accordance with the present invention.

FIG. 5 illustrates an implementation of a buffer for one line of an I²C bus 100 in accordance with the present invention. Two of these circuits are needed to fully buffer an I²C bus-one for SCL and one for SDA. Buffer 100 is a mirror image of buffer 110. The buffer functions in a way such that data can flow in either direction simultaneously. In order to control the flow of data, a switch is usually necessary but can be difficult to implement. Another way of doing this is to sense the direction a current is flowing and then help it flow in the correct direction. FIG. 5 achieves this function. When a signal at 630 is flowing left to right, node 630 is pulled towards a zero voltage. A positive voltage will then result across the resistor 640 which will in turn be sensed by operational amplifiers 650 and 660. Operational amplifier 650 leaves its output transistors 670 in an off-state and operational amplifier 660 turns on its output transistors which in turn brings a signal at 690 down to about a zero voltage as well. If a signal was flowing right to left, an opposite process will occur.

Figure 6:
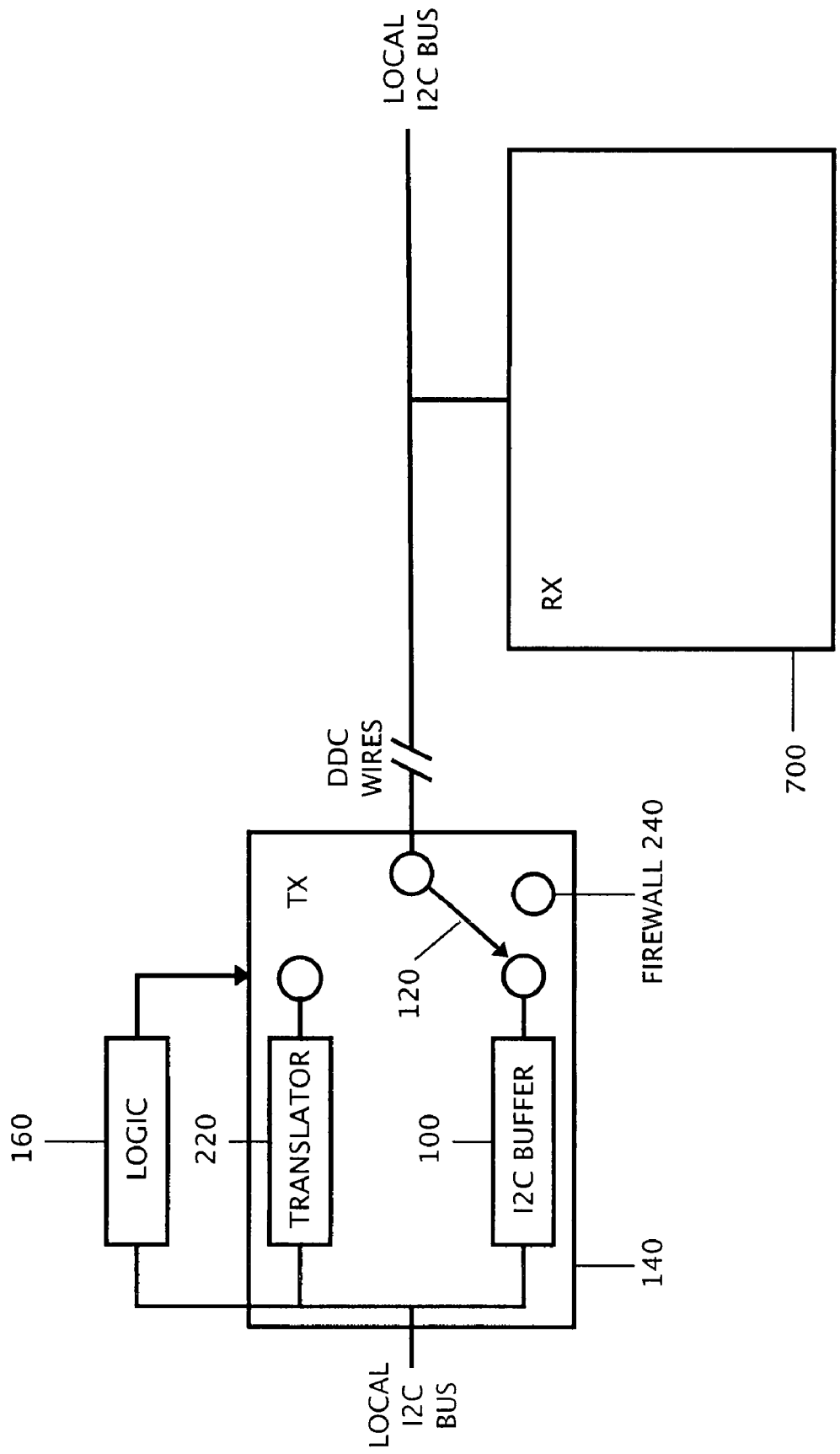
FIG. 6 illustrates a legacy mode of operation in relation to the receiver in accordance with the present invention.

FIG. 6 illustrates a legacy mode of operation in relation to the receiver in accordance with the present invention. The receiver 700 does not have a buffer 100 or a translator 220 as shown on the transmitter 140. In this situation, the switch 120 is kept connected to the buffer 100 by the logic 160, as the receiver can not support the new style protocols. Selection of a firewall 240 on the transmitter 140 is still possible, however.

Figure 7:
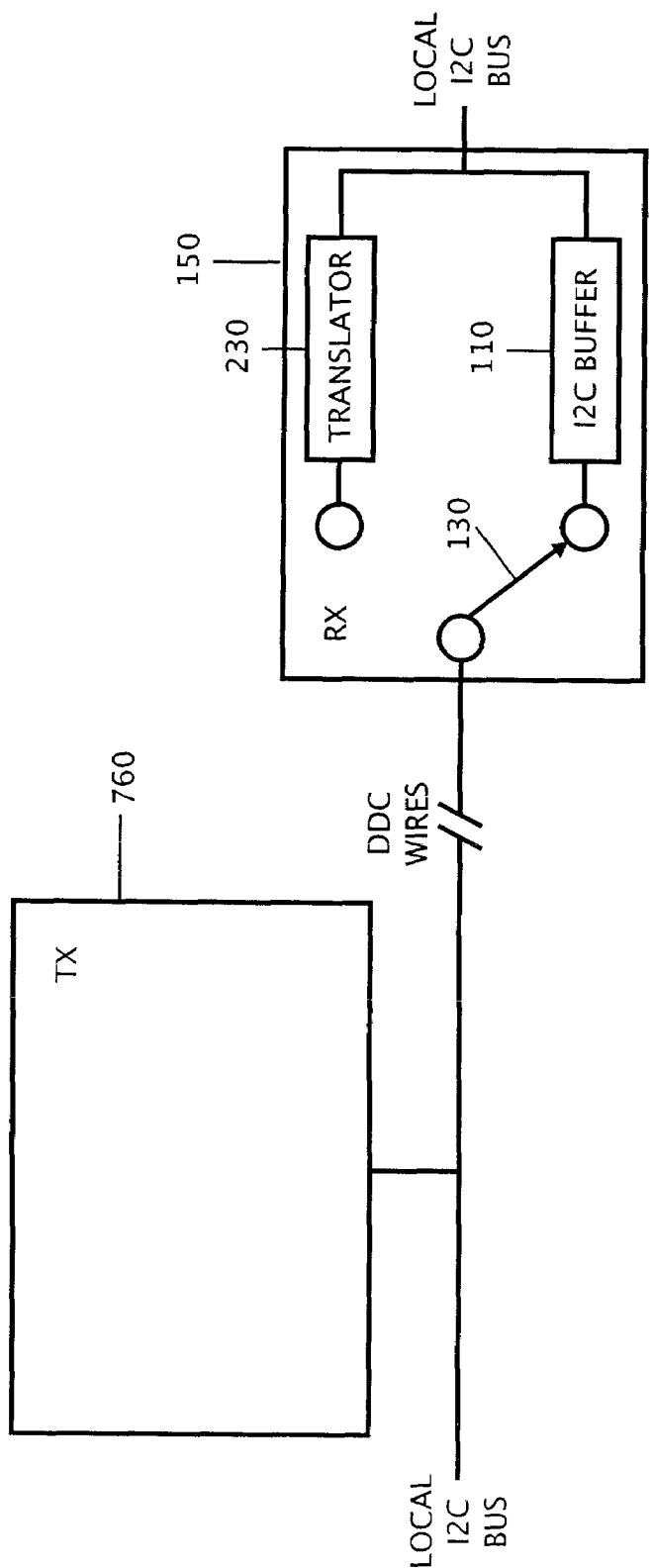
FIG. 7 illustrates a legacy mode of operation in relation to the transmitter in accordance with the present invention.

FIG. 7 illustrates a legacy mode of operation in relation to the transmitter in accordance with the present invention. The transmitter 760 does not have a buffer 110 or a translator 230 as shown on the receiver 150. In this situation, the switch 130 is kept connected to the buffer 110 as defined in the default mode.

The present invention provides a method and apparatus for a two-wire serial command bus interface. The re-mapping allows for high-speed data transmission, data security and is not constrained by length issues. Additionally, a transmitter side firewall prevents unauthorized access.

An advantage of the present invention is that it is fully compatible with legacy hardware. It intelligently detects whether a device can support new or old protocols and adjusts accordingly. Additionally, even in the absence of new protocol compatibility, it improves upon legacy systems by increasing available cable length and also by providing a transmitter-side firewall.

While this invention has been described in terms certain preferred embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What we claim is:

1. A system for bi-directional transmission of data between a source and sink over a Display Data Channel (DDC) compatible two-wire interface, the system comprising:

a first translator responsive to and operative to develop a first local I²C bus signal for signal current flow in a first direction and responsive to and operative to develop a different protocol signal over the DDC-compatible two-wire interface for signal current flow in a second direction;

the first translator including an I²C port for converting serial data signal and serial clock signal into internal signal blocks, a translation logic for translating the internal signal blocks to the different protocol signal, and a physical interface for interfacing the translated different protocol signal onto the DDC-compatible two-wire interface;

a first buffer responsive to and operative to develop the first local I²C bus signal for signal current flow in the first direction and responsive to and operative to develop a buffered signal including a buffered data signal and a buffered clock signal for signal current flow in the second direction;

the first buffer including a first data buffer circuit for assisting the current flow of the serial data signal to extend the distance over which the serial data signal may be communicated, and a first clock buffer circuit for assisting the current flow of the serial clock signal to extend the distance over which the serial clock signal may be communicated;

the buffered data signal being communicated over a first wire of the DDC-compatible two-wire interface and the buffered clock signal being communicated over a second wire of the DDC-compatible two-wire interface;

a logic responsive to the first local I²C bus signal and operative to control a first switch coupled to the DDC-compatible two-wire interface wherein the first switch connects the DDC-compatible two-wire interface to one of the first translator, the first buffer, and an isolation firewall in which electrical access to the source via the DDC two-wire interface is cut off;

a second translator responsive to and operative to develop the different protocol signal for signal current flow in the first direction and responsive to and operative to develop a second local I²C bus signal for signal current flow in the second direction when the first switch is connected to the first translator and a second switch coupled to the DDC-compatible two-wire interface is connected to the second translator; and a second buffer responsive to and operative to develop the buffered signal including the buffered data signal and the buffered clock signal for signal current flow in the second direction; and responsive to and operative to develop the second local I²C bus signal for signal current flow in the first direction when the first switch is connected to the first buffer and the second switch coupled to the DDC-compatible two-wire interface is connected to the second buffer.

2. The system as recited in claim 1 wherein the different protocol signal is defined in an ethernet protocol.

3. The system as recited in claim 1 wherein different protocol signal is defined in a TCP/IP protocol.

4. The system as recited in claim 1 wherein the different protocol signal is defined in an RS-232 protocol.

5. The system as recited in claim 1 wherein the different protocol signal is defined in a current loop protocol.

6. A method for buffering signals between a source and a sink over a Display Data Channel (DDC) compatible two-wire interface comprising:

buffering on the source a serial data signal and a serial clock signal received from a local I²C bus on the source;

transmitting from the source to the sink the serial data signal and the serial clock signal over the DDC-compatible two-wire interface;

buffering at the sink the data and clock signals, the buffering including buffering the data signal to assist the current flow of the serial data signal to extend the distance over which the serial data signal may be communicated, and buffering the clock signal to assist the current flow of the serial clock signal to extend the distance over which the serial clock signal may be communicated;

communicating the buffered data signal over a first wire of the DDC-compatible two-wire interface and the buffered clock signal being communicated over a second wire of the DDC-compatible two-wire interface, the buffing further including sensing a direction of current flow and assisting the current flow in the sensed direction to extend the distance over which the clock signal and the data signal may be communicated;

re-transmitting from the sink the data and clock signals over the DDC-compatible two-wire interface to the source as needed; and performing an isolation firewall function by selectively switching to an isolation firewall setting to close access from the source to the DDC-compatible two-wire interface.

7. A system for buffering signals between a source and a sink over a Display Data Channel (DDC) compatible two-wire interface comprising:

a first buffer responsive to a first I²C local bus signal and responsive to and operative to develop a buffered serial data signal and a buffered serial clock signal;

the first buffer including a first data buffer circuit for assisting the current flow of the serial data signal to extend the distance over which the serial data signal may be communicated, and a first clock buffer circuit for assisting the current flow of the serial clock signal to extend the distance over which the serial clock signal may be communicated;

the buffered data signal being communicated over a first wire of the DDC compatible two-wire interface and the buffered clock signal being communicated over a second wire of the DDC compatible two-wire interface;

a logic responsive to the first local bus signal and operative to controlling a first switch coupled to the DDC-compatible two-wire interface wherein the switch connects to the first buffer or an isolation firewall setting in which electrical access to the source via the DDC two-wire interface is cut off; and a second buffer responsive to and operative to develop the buffered data signal and the buffered clock signal and responsive to and operative to develop a second I²C local bus signal when the first switch is connected to the first buffer and a second switch coupled to the DDC-compatible two-wire interface is connected to the second buffer.

8. A system for buffering signals between a source and a sink over a two-wire interface comprising:

a first buffer responsive to a first local bus signal and operative to develop a buffered serial data signal and a buffered serial clock signal from the first local bus signal, the first buffer including a first data buffer circuit for assisting the current flow of the serial data signal to extend the distance over which the serial data signal may be communicated, and a first clock buffer circuit for assisting the current flow of the serial clock signal to extend the distance over which the serial clock signal may be communicated;

the buffered serial data signal being communicated over a first wire of the DDC-compatible two-wire interface and the buffered serial clock signal being communicated over a second wire of the DDC-compatible two-wire interface;

a logic responsive to the first local bus and operative to controlling a first switch coupled to the two-wire interface wherein the switch connects to one of the first buffer and an isolation firewall setting; and the sink coupled to the two-wire interface and responsive to the buffered data signal and the buffered clock signal when the switch is connected to the first buffer.

9. A system for bi-directional transmission of data between a source and sink over a Display Data Channel (DDC) compatible two-wire interface, the system comprising:

a first translator responsive to and operative to develop a first local bus signal and responsive to and operative to develop a different protocol signal over the DDC-compatible two-wire interface;

a first buffer responsive to and operative to develop the first local bus signal and responsive to and operative to develop a buffered signal including a buffered data signal and a buffered clock signal;

a logic responsive to the first local bus signal and operative to control a first switch coupled to the DDC-compatible two-wire interface wherein the first switch connects the DDC-compatible two-wire interface to one of the first translator and the first buffer;

a second translator responsive to and operative to develop the different protocol signal and responsive to and operative to develop a second local bus signal when the first switch is connected to the first translator and a second switch coupled to the DDC-compatible two-wire interface is connected to the second translator; and a second buffer responsive to and operative to develop the buffered signal including the buffered data signal and the buffered clock signal; and responsive to and operative to develop the second local bus signal when the first switch is connected to the first buffer and the second switch coupled to the DDC-compatible two-wire interface is connected to the second buffer.

10. The system as recited in claim 9, wherein:

the first buffer including a first data buffer circuit for assisting the current flow of the serial data signal to extend the distance over which the serial data signal may be communicated, and a first clock buffer circuit for assisting the current flow of the serial clock signal to extend the distance over which the serial clock signal may be communicated; and the buffered data signal being communicated over a first wire of the DDC-compatible two-wire interface and the buffered clock signal being communicated over a second wire of the DDC-compatible two-wire interface.

11. The system as recited in claim 9, wherein:

the first translator for converting serial data signals and serial clock signals into internal signal blocks, a translation logic for translating the internal signal blocks to the different protocol signal, and a physical interface for interfacing the translated different protocol signal onto the DDC-compatible two-wire interface.

12. The system as recited in claim 9, wherein:

the first switch connects the DDC-compatible two-wire interface to one of the first translator, the first buffer, and an isolation firewall in which electrical access to the source via the DDC two-wire interface is cut off.

13. The system as recited in claim 9, wherein the different protocol signal is a protocol selected from the set consisting of an Ethernet protocol, a TCP/IP protocol, an RS-232 protocol, and a current loop protocol.

14. A method for buffering signals between a source and a sink over a two-wire interface comprising:

buffering on the source a serial data signal and a serial clock signal received from a local bus on the source;

transmitting from the source to the sink the serial data signal and the serial clock signal over the two-wire interface;

buffering at the sink the data and clock signals, the buffering including buffering the data signal to assist the current flow of the serial data signal to extend the distance over which the serial data signal may be communicated, and buffering the clock signal to assist the current flow of the serial clock signal to extend the distance over which the serial clock signal may be communicated;

communicating the buffered data signal over a first wire of the two-wire interface and the buffered clock signal being communicated over a second wire of the two-wire interface, the buffing further including sensing a direction of current flow and assisting the current flow in the sensed direction to extend the distance over which the clock signal and the data signal may be communicated; and re-transmitting from the sink the data and clock signals over the two-wire interface to the source as needed.

15. The method as recited in claim 14, wherein: the two-wire interface comprises a Display Data Channel (DDC) compatible two-wire interface and the local bus comprises a local I²C bus.

16. The method as recited in claim 14, further comprising: performing an isolation firewall function by selectively switching to an isolation firewall setting to close access from the source to the two-wire interface.

* * * * *